United States Patent
Yuan (10) Patent No.: US 8,829,366 B2
(45) Date of Patent: Sep. 9, 2014

(54) HIGH PRECISION WEIGHING ARRAY SYSTEM FOR WEIGHING DISPERSED MATERIAL IN MOTION ON A CONVEYOR BELT ASSEMBLY

(76) Inventor: Yanqiang Yuan, Nanjina (CN)

( * ) Notice: Subject to any disclaimer, the term of this patent is extended or adjusted under 35 U.S.C. 154(b) by 255 days.

(21) Appl. No.: 12/669,990

(22) PCT Filed: Jan. 29, 2008

(86) PCT No.: PCT/CN2008/000210
§ 371 (c)(1),
(2), (4) Date: Jan. 21, 2010

(87) PCT Pub. No.: WO2009/012637
PCT Pub. Date: Jan. 29, 2009

(65) Prior Publication Data
US 2010/0170724 A1    Jul. 8, 2010

(30) Foreign Application Priority Data

Jul. 23, 2007    (CN) .......................... 2007 1 0025317

(51) Int. Cl.
*G01G 11/04* (2006.01)

(52) U.S. Cl.
CPC ...................................... *G01G 11/04* (2013.01)
USPC ........................................................ 177/145

(58) Field of Classification Search
USPC ...................................... 177/16, 17, 119, 145
See application file for complete search history.

(56) References Cited

U.S. PATENT DOCUMENTS

| | | | | |
|---|---|---|---|---|
| 3,331,457 A | * | 7/1967 | Blubaugh | 177/16 |
| 3,513,921 A | * | 5/1970 | Refer et al. | 177/16 |
| 3,561,553 A | * | 2/1971 | Blubaugh | 177/168 |
| 3,869,007 A | * | 3/1975 | Haggstrom et al. | 177/211 |
| 3,924,729 A | * | 12/1975 | Flinth et al. | 177/16 |
| 3,935,913 A | * | 2/1976 | Wagner et al. | 177/134 |
| 4,463,816 A | * | 8/1984 | MacFarlane | 177/119 |
| 4,976,326 A | | 12/1990 | McConnell et al. | |
| 5,285,019 A | * | 2/1994 | Kempf et al. | 177/16 |

(Continued)

FOREIGN PATENT DOCUMENTS

| | | |
|---|---|---|
| CN | 2560930 | 7/2003 |
| CN | 1534280 | 10/2004 |
| GB | 2128345 | 4/1984 |

OTHER PUBLICATIONS

Machine translation of CN 2560930 (Yan), Mar. 28, 2012.*

(Continued)

*Primary Examiner* — Randy W Gibson
(74) *Attorney, Agent, or Firm* — Suzannah K. Sundby; Canady + Lortz LLP (57) ABSTRACT

A belt weighing array system for dispersed material in a transportation process of measurement is mainly composed of a weighing sensor (12), a bearing beam (11), a supporting roller holder (10), and weighing supporting rollers (3). On both ends of the supporting roller holder (10) formed by at least two parallel arms, the weighing supporting rollers (3) are supported respectively, and the middle part of the supporting roller holder (10) is fastened with the bearing beam (11) across both sides, which is connected to a force transfer unit of the weighing sensor (12) fixedly. The sensor belongs to single type weighing sensor, and its base is arranged fixedly on a frame of a belt transporter by both sides.

21 Claims, 3 Drawing Sheets

(56) References Cited

U.S. PATENT DOCUMENTS

| | | | | |
|---|---|---|---|---|
| 5,304,745 | A * | 4/1994 | Rusk et al. | 177/50 |
| 6,835,900 | B2 | 12/2004 | Jones | |
| 8,063,321 | B2 * | 11/2011 | Wineland et al. | 177/126 |
| 8,304,669 | B2 * | 11/2012 | Duppre | 177/126 |
| 2010/0288565 | A1 * | 11/2010 | Wineland et al. | 177/145 |
| 2012/0279787 | A1 * | 11/2012 | Huebler et al. | 177/145 |

OTHER PUBLICATIONS

Machine translation of CN CN 1534280 (Huo), Mar. 28, 2012.*
"Hardy Process Solutions: Measurement, Automation, Productivity" (http://www.hardysolutions.com/tenants/hardy/documents/LPSGrevision2012version3.pdf), pp. 1-28, Dec. 18, 2012.*
International Search Report received in PCT/CN2008/000210 with English Translation mailed May 29, 2008.

* cited by examiner

--Prior Art--

Figure 1

--Prior Art--

HIGH PRECISION WEIGHING ARRAY SYSTEM FOR WEIGHING DISPERSED MATERIAL IN MOTION ON A CONVEYOR BELT ASSEMBLY

TECHNICAL FIELD OF THE INVENTION

The present invention relates generally to a weighing apparatus, as well as, in one embodiment, a belt weighing array. Both aspects and embodiments of the present invention measure a mass of bulk material in motion, while the material is disposed on the belt.

BACKGROUND TO THE INVENTION

Belt weighers are widely used for measuring a mass of bulk material in motion. It is thought that, at present, approximately 98% of continuous mass measurement of belt-conveyed bulk material is done by belt weighers that use the gravitational measurement principle. Based on the applicant's long period of practice and research in this area, the technological features of known belt weighers are summarized hereinbelow:

1. Known Belt Weighers

Known belt weighers are used to measure the mass of bulk material in motion. Usually, a weighing platform is installed at a certain section of a conveyor belt assembly. That is, a customized belt weigher platform is installed onto the conveyor belt assembly using the original conveyor belt frame and rollers.

Known arrangements of conveyor belt assemblies in use are such that the material being conveyed is disposed on the belt, the weigher platform is disposed under the conveyor belt, the belt being disposed between the material and the weigher platform. As a result, the parameters of the belt greatly affect the accuracy of any bulk material mass measurement.

Due to their unreliable and inaccurate readings, known belt weighers are unsuitable for use in legally binding trade. Thus, most present-day bulk material trades are measured using an age-old waterline method or by using an expensive truck scale. An in-motion belt weigher having improved accuracy would be a great improvement on the present day situation.

2. Structure, Advantages and Disadvantages of Known In-Motion Belt Weighers

A. Multi-Roller Double-Lever Belt Weigher (FIG. 1)

Figure 1:
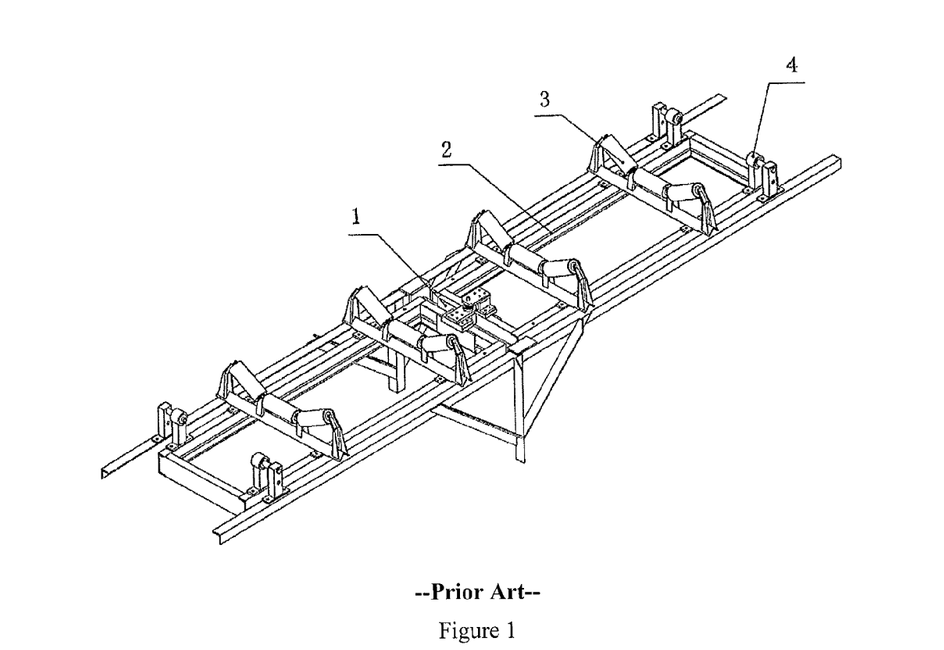
FIG. 1 shows a multi-roller double-lever belt weigher in accordance with the prior art.

Referring now to FIG. 1, a weighing unit of the type of belt weigher shown consists of two sets of levers facing each other. Each set of levers consists of a pivot 1 (common types include bearing, rubber bearing, knife-edge bearing and flexible tensioner), a frame 2 (normally use channel steel or C-channel steel), weighing rollers 3 (usually two or four sets) and load cells 1. The main advantage of this belt weigher is that the two sets of levers convert the horizontal force on the frame into two equal torques in opposite directions, hence cancelling each other. However, this system has a heavy structure and normally weighs 400-800 kg; the pivot itself in use can cause error as displacement may happen due to the structural deformation of the steel structure which reduce stability; and the length of weighing area is relatively short (only between two or four sets of weighing rollers).

B. Full Suspension Multi-Roller Belt Weigher (FIG. 2)

Figure 2:
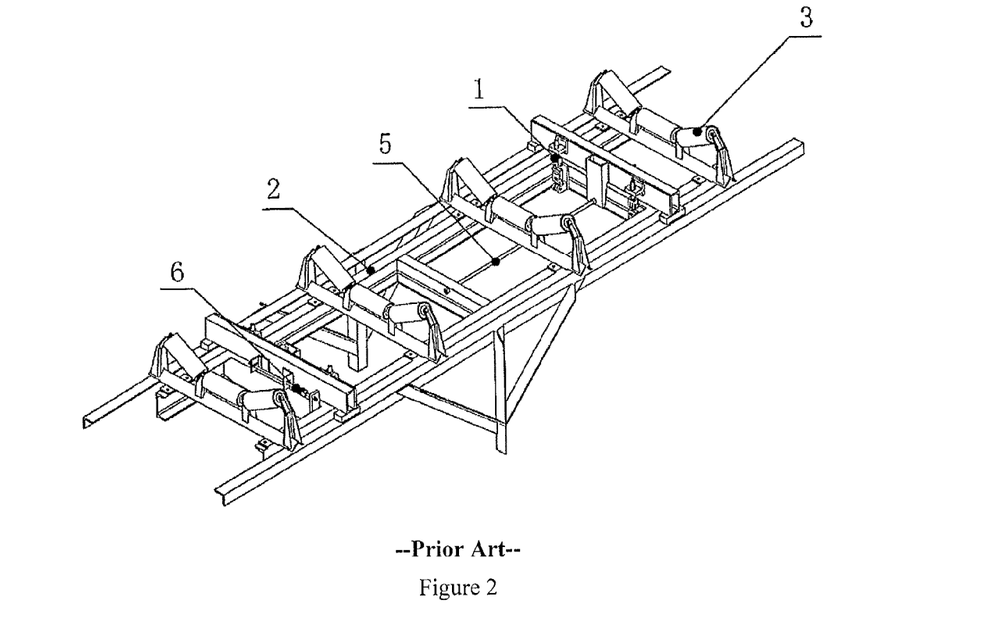
FIG. 2 shows a full suspension multi-roller belt weigher in accordance with the prior art.

Referring now to FIG. 2, a weighing unit of the type of belt weigher shown uses three or four load cells 1 to support the weighing platform. Two to four sets of weighing rollers 3 are installed on the weighing platform. The advantages of this system are that it eliminates the errors associated with mechanical hinges, the structure is relatively simple and stability is enhanced compared with the weighing unit design shown in FIG. 1. The disadvantages of this system include an increased number of load cells compared with the design shown in FIG. 1; a requirement for close parameter coordination between the load cells (that is, if the load cell parameters do not closely match, error will occur in the case of uneven and off-centre belt loads); movement of the supporting steel structure of the four load cells can cause interference among the load cells, thus a suspension system using axial and horizontal hinges 5, 6 is needed to connect the load cells and the frame; the structure of the steel frame is heavy (a total of 200-500 kg); and the length of weighing area is relatively short (structural weigh increases significantly if length is increased)

C. Single-Roller Belt Weigher

A weighing unit of this type of belt weigher uses two load cells to support one weighing roller assembly. The advantages of this type of weighing unit include light structure, alleviation of problems associated with mechanical hinges. However, the disadvantages of this type of weighing unit are that it is uneconomical to use two load cells for one weighing roller assembly; there is a requirement for close parameter coordination between the two load cells; interference still occurs when the pivot mounts of the load cells shift, and thus certain flexible connections are still needed; and serial connection of such units becomes unwieldy.

The above-mentioned weighing unit systems are the most commonly used known structures. Other known structures are all based on similar principles and therefore have similar advantages and disadvantages Overall, known belt weighers cannot meet the requirements of legally-binding trade operation because the problems affecting accuracy and stability of in-motion mass measurement have not been satisfactorily overcome.

The present invention seeks to ameliorate the problems of known belt weigher units through the study of elements affecting accuracy and stability of belt weighers. Compared to known belt weighers, the preferred embodiments of the present invention, which is a belt weighing array system for dispersed material described herein has improved accuracy and reliability as well as simpler structure, therefore making it an ideal candidate for use in trade.

To alleviate the technical problems of known belt weighers, the applicant analysed the main sources of error and concluded that there are three main sources:

A. Load Cell and Computer Instruments

Due to the technological development in load cells and instruments, the error from this area of belt weighers has been reduced to 5-10% of total allowed error and hence is negligible. However, when more than one load cell is used in one weighing unit, parameter coordination problems will arise unless the bulk material on the belt is arranged uniformly.

B. Error Associated with Weighing Frame

The structure of the steel frame has a great impact on accuracy. Stresses caused by welding and deformation of that supporting steel frame can change the force status of the weighing unit frame. Such changes cause interference between hinges and thus result in measurement errors. This is also an important contributing factor to long term reliability problems associated with belt weighers.

C. Effect of Belt Tension

Belt tension is caused by conveyor motors driving the belt. Tension force is affected by the flow of material and it is the major source of error for belt weighing units.

Figure 3:
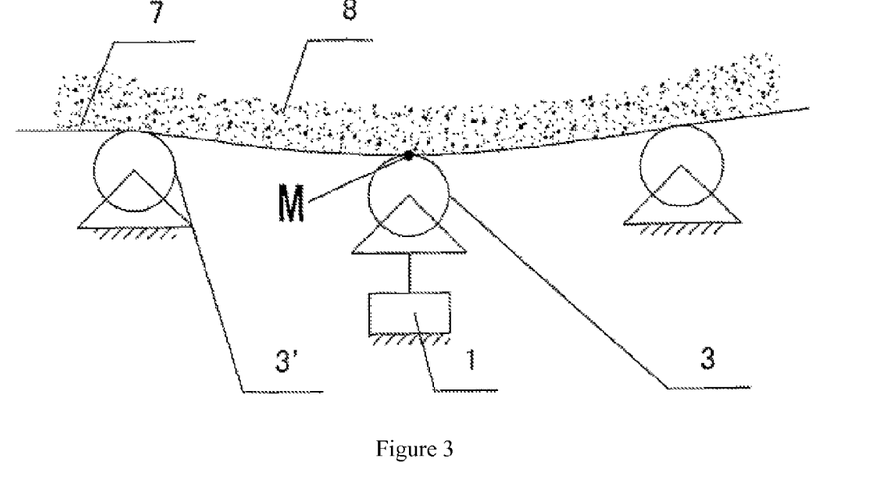
FIG. 3 is a schematic side elevation view of the weighing unit of a preferred embodiment of the current invention.
Figure 4:
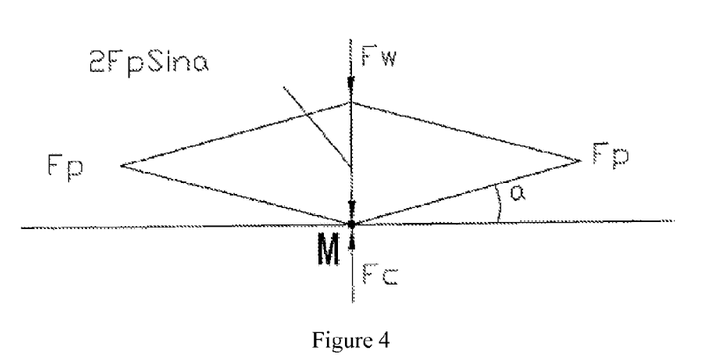
FIG. 4 shows a force vector diagram of a system loaded as shown in FIG. 3.

Referring to FIG. 3, a simplified depiction of a belt weigher is shown. In that Figure, the numeral 3' refers to the fixed roller, numeral 1 refers to the load cell, numeral 3 refers to the weighing roller, numeral 7 refers to the belt and numeral 8 refers to the bulk material carried by the belt. A diagram showing forces acting on each abovedescribed component is presented in FIG. 4 where Fw is the gravitational force of the material, Fc is the gravitational force of the material exerted on the load cell, Fp is the belt tensional force and α is the angle formed by the downward deflection of the weighing roller under the load of the bulk material disposed on the belt. These forces can be expressed in the following formula:

$$Fw-Fc=2Fp \times \sin \alpha$$

Error-free mass readout is achieved when Fw=Fc, which means that the resulting force of $2Fp \times \sin \alpha$ is the source of error in the mass readout of a weighing unit.

The reason for this error is the relative difference between the height of the weighing roller and the fixed rollers which creates the angle α. There are three factors that contribute to this:

1. The flexing and sinking of weighing frame which causes the angle α. To overcome this, manufacturers normally focus on increasing rigidity which increase the weight of the whole structure;
2. Angle α can increase due to factors such as changes in thickness of the belt and elevation of belt as material adheres to the weighing roller. This is an unavoidable occurrence during the use of belt weighers;
3. The quality of installation of the belt weigher can also contribute to error in that angle α will be positive if the belt weighing unit is not installed in a perfectly horizontal disposition. In addition, belt tension may change in operation due to factors such as the change in material throughput with the result that the error changes.

The present invention seeks to ameliorate one or more of the abovementioned disadvantages.

SUMMARY OF INVENTION

Therefore, in accordance with one aspect of the present invention, there is provided a bulk material belt weighing unit including: a single point load cell and a weighing frame, the frame including a weight bearing beam; roller brackets and weighing roller assemblies, wherein there are provided at least two roller brackets spaced apart from and generally parallel to each other, the two ends of the roller brackets supporting respective weighing roller assemblies so that they are spaced apart from one another, an intermediate part of each roller bracket being connected to the weight bearing beam so that each roller bracket is disposed either side of the weight bearing beam, the weight bearing beam being connected to a force transmitting portion of the load cell, a load bearing portion of said load cell being connected to a base beam, the two ends of the base beam in use being connected with the frame of the conveyor belt.

Further, in accordance with another aspect of the present invention, there is provided a bulk material belt weighing system adapted to be installed in a gap on a conveyor belt frame, the frame having fixed rollers installed at either end of the conveyor belt frame gap; wherein the system includes a plurality of weighing units installed in the gap, the weighing units including a single point load cell and a weighing frame, the frame including a weight bearing beam; roller brackets and weighing roller assemblies, wherein there are provided at least two roller brackets spaced apart from and generally parallel to each other, the two ends of the roller brackets supporting respective weighing roller assemblies so that they are spaced apart from one another, an intermediate part of each roller bracket being connected to the weight bearing beam so that each roller bracket is disposed either side of the weight bearing beam, the weight bearing beam being connected to a force transmitting portion of the load cell, a load bearing portion of said load cell being connected to a base beam, the two ends of the base beam in use being connected with the frame of the conveyor belt.

During operation of preferred embodiments of the present invention, the force of the bulk material on the belt is transferred to the weighing rollers, the weighing rollers in turn transfer that force onto the load cell through the roller bracket and the weight bearing beam. The detection of weight is completed when the load is transferred to the load cell.

The weighing unit of preferred embodiments of the present invention include the following structural features:

1. Each weighing unit has only one support point. This simplifies the structure and more importantly, improves long-term reliability. In known belt weighers, neither the structure of the weighing platform or the frame that supports it inhibits deformation caused by external force and fatigue stress, therefore the multiple support point load cells in the platform will inevitably interfere with one another. When used to prevent this interference, the suspended hinges or flexible hinges complicate the structure and cause further error. As a result, long-term reliability is always a major problem for known belt weighers. In contrast, the weighing unit of preferred embodiments of the present invention use only one support point, which eliminates any interference or any interactive movement between support points. Thus, long-term reliability is achieved.
2. The single-point load cell corresponding to the 'single-point' support structure is another distinct feature of preferred embodiments of the present invention. The design of the 'single-point' support structure allows the use of the single-point load cell. Such load cell is normally used in static weighers, has never been used in motion weighers, and has two major advantages in comparison with conventional load cells:
    i. High resistance to errors due to unevenly-placed loads because on any part of the weighing platform supported by a single-point load cell, the same object always weighs the same by the load cell, effectively eliminating the problems associated with uneven loads;
    ii. Only the vertical force is measured. Horizontal force does not have any impact and thus no additional structure or device is required to counter the horizontal force. It alleviates the above-mentioned errors and greatly simplifies the connection structure.
3. The weighing unit structure of preferred embodiments of the present invention is simple yet effective. In preferred embodiments, the weight bearing beam is made from a steel sheet bent into a channel shape. The height of the weight bearing beam of preferred embodiments helps to achieve an ideal stiffness modulus with light-weight material. Further, single-point load cells are usually large in size, so, by having two sets of weighing rollers and one load cell in between, the effective weighing portion is increased, the height is decreased and the centre of gravity of the platform is lowered, which is a feature of preferred embodiments. Moreover, such structure alleviates the problem of placement of large-size load cell.

The belt weighing array system for bulk material of preferred embodiments of the present invention uses multiple weighing units described above to form a weighing system array. In that array, fixed rollers are installed at the ends of the conveyor belt frame. Between the two ends a series of weighing units are evenly spaced and installed. Each weighing unit is as above described.

The number of units used in the array depends on the required accuracy, the allowed space for installation and cost. Theoretically the structure of the system does not limit the number of units in the array.

As mentioned above, the main sources of error of known belt weighers come from the weighing structure and belt tension. Structural related error can be reduced or eliminated by improving the structures. However, errors associated with belt tension still cannot be completely eliminated. However, the theory of preferred embodiments of the present invention set out below shows that it can substantially alleviate those errors.

Figure 7:
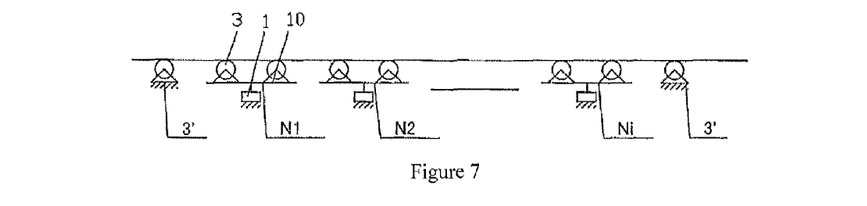
FIG. 7 is a schematic side elevation view of a belt weighing array of a preferred embodiment of the present invention.

In that regard, FIG. 7 shows a schematic diagram of the high precision belt weighing array system for bulk material of a preferred embodiment of the present invention. By carefully analyzing the relationships between the weighing units, it can be seen that the error inducing force associated with belt tension of any weighing unit is $2Fp \times \sin \alpha$. At the same time, the forces on the weighing roller next to each side of the weighing unit are both $Fp \times \sin \alpha$ at the opposite to the error force. When added together, those three forces cancel each other. The only exception is when the roller next to one side of a weighing unit is a fixed roller. In this case, the error force cannot be cancelled. In summary, the force on adjacent weighing rollers (as oppose to fixed rollers) cancel each other out.

Figure 8:
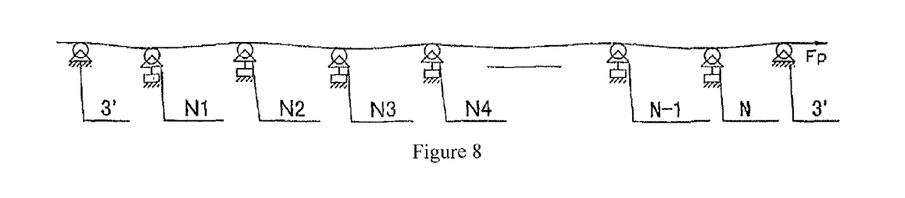
FIG. 8 is a further simplified schematic view of FIG. 7.

FIG. 7 is further simplified as shown in FIG. 8, which represents an array of weighing units. If we assume belt tension is consistent (Fp) in this array, in that bulk material is uniformly placed on the belt, odd number units sink to the same level and even number units remain in their original position. Thus, according to the formula stated above, the error of the array system is:
Error of unit N1 is $(+2F_P \times \sin \alpha)$;
Error of unit N2 is $(-2F_P \times \sin \alpha)$;
. . .
Error of unit N (N=even number) is $(-Fp \times \sin \alpha)$;
And so on
The total error of the system is:

$$\Sigma F_w - \Sigma F_c = (F_{m1} - F_{c1}) + (F_{m2} - F_{c2}) + \ldots (F_{mn} - F_{cn})$$
$$= (+2F_p \times \sin\alpha) + (-2F_p \times \sin\alpha) \ldots$$
$$= +2F_P \times \sin\alpha (N = \text{odd number})$$
$$= -Fp \times \sin\alpha (N = \text{even number})$$

Thus, it can be said that the absolute value error is constant regardless of the number of weighing units used. Therefore, as the number of units increase, the relative value of the error in the whole system is reduced. In summary, in this array system the effect of belt tension is limited to the fixed roller at the beginning and the end of the system only.

According to this theory, if using existing belt weigher units, such an array system cannot eliminate errors because of the structural problems of those weighing units mentioned above. In other words, the weighing units used in the array of preferred embodiments should be simple, stable and highly efficient. Thus, it is preferred that the weighing unit array of preferred embodiments of the present invention utilise the weighing units abovedescribed.

The array of preferred embodiments of the present invention has the following features:

1. Weighing platform and load cell has only one fixed connection. No connection exists between the weighing platform and the conveyor belt frame. Thus error relating to both deformation, as well as errors caused by flexible connections among the force transmitting parts can be avoided. The reliability of the belt weigher, even in harsh conditions, can be ensured.
2. Minimum number of load cells is used while maximum effective weighing length is obtained. Effective load measured by the load cells is significantly higher than any other types of belt weighers and hence achieved the highest efficiency, as a result, the signal processing system is simplified.
3. The weighing platform is light weight but with good rigidity. When 10 weighing units are used in one array system, the total weight of the system is about 500 kg. It is not only economical but also can be easily installed and maintained.
4. Common scenarios that normally cause error in traditional belt weighing systems, such as material adhesion on weighing rollers and off-center load do not have any effect on accuracy. This significantly reduced maintenance requirement (existing types of belt weighers can be greatly affected by belt tension and the condition of weighing rollers in use. Thus there are exact requirements on manufacture, usage and maintenance of weighing rollers)

In conclusion, the high precision belt weighing array system for dispersed material and its weighing units can significantly reduce weighing errors associated with structure and belt tension. It has ideal measuring accuracy, high stability, simple structure and low cost. Thus it has a very high chance to become a practical measuring instruments used for legal-trade purpose.

DETAILED DESCRIPTION OF THE PREFERRED EMBODIMENT

Figure 5:
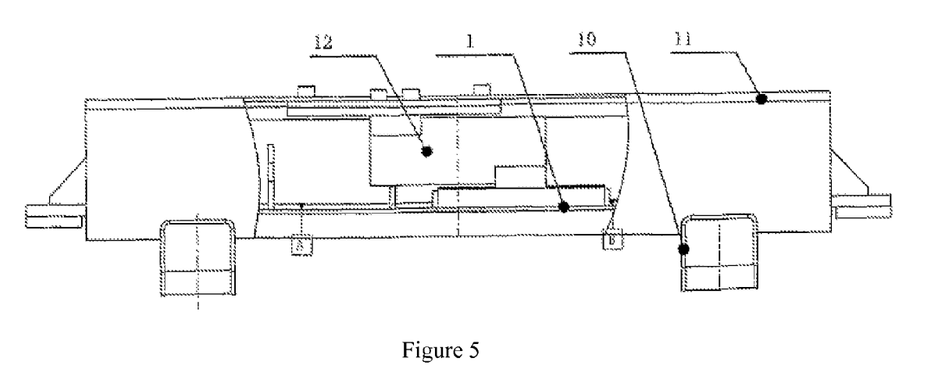
FIG. 5 is a cross section view of a weight bearing beam shown FIG. 6.
Figure 6:
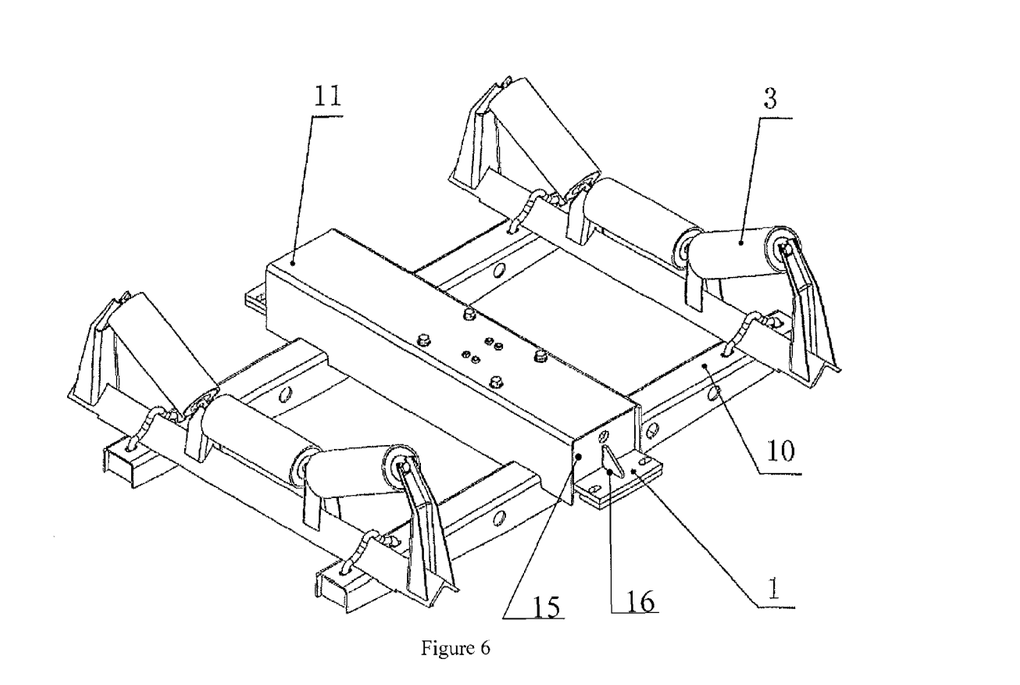
FIG. 6 is an isometric view of a preferred embodiment of the present invention.

Referring to FIGS. 5 and 6 there is shown a weighing unit in accordance with a preferred embodiment of the present invention. The weighing unit includes a load cell 12, a weighing frame including a weight-bearing beam 11, roller brackets 10 and weighing rollers 3. In the embodiment shown there are two roller brackets 10, on either side of the load cell and approximately parallel to each other, which use support portions to support the three-part, V-shape weighing roller assemblies 3, disposed at both roller bracket or weighing frame ends respectively. Weight bearing beam 11 in the preferred embodiment shown uses steel sheet that bent in a channel shape, which has a higher bending resisting modulus with relatively light weight than a solid beam. Thus the weight-bearing beam is resistant to sinking under weight, despite its light structure. The channel shape weight-bearing beam has two indentations adjacent to each end that correspond with roller bracket 10. Mid sections of the two weight-bearing beams 11 are located and welded in the respective indentations at load-bearing beam 11, thus the whole unit forms a rectangle shape having an additional central rib. As also shown in FIG. 5, the single point load cell 12 is installed inside the channel-shaped weight-bearing beam at an intermediate position. The force transmitting piece of the load cell 12 is connected to weight bearing beam 11 by bolts, the load bearing piece being fixedly connected to the base beam 1. The two ends of base beam 1 are the extended ends of weight bearing beam 11, which are used for fixed connection with the belt conveyor frame. Vertical baffles 15 are welded close to the base beam 1 near both ends of the weight bearing beam 11, which increase the rigidity of the base beam 1, and prevent dust and debris from affecting the accuracy of the load cell. Triangular stiffeners 16 are welded between the vertical baffle and the extension of the base beam 1, which further increase the rigidity of the base beam 1.

The abovedescribed system uses one load cell in between two weighing rollers to carry the weighing structure which has the following advantages:

1. Increase the effective weight on load cell;
2. Lower the centre of gravity and overall height; and
3. Solve the problem of positioning the load cell.

During operation of the weighing unit, the force of the bulk material on the belt is transferred through the weighing roller 3 to the roller bracket 10, then through the weight bearing beam 11 to the force transmitting piece of the load cell, and applied to the load bearing piece that is installed on the base beam. That force transfer process is illustrated and analysed in FIGS. 3 and 4.

Another preferred embodiment of the present invention is a bulk material high precision array belt weighing system which is formed by a series connection of multiple weighing units abovedescribed. The specific embodiment is to arrange fixed rollers 3 at the two ends of the conveyor belt frame, and install a series of weighing units N1 . . . Ni between the two fixed rollers with space between each other, as shown in FIG. 7, or shown in FIG. 8 with further simplification. The number of weighing units N in the array system can be from one to dozens. It is shown in theory and in practice that a system with a plurality of weighing units, preferably eight or above should be precise enough for legal and trade purposes.

The characteristics of systems of preferred embodiments of the present invention can be compared to known technology in the following table.

|  | Example of preferred embodiment | Multi-roller double lever | Full suspension multi-rollers | Single-roller suspension | Note |
|---|---|---|---|---|---|
| No. of load cells | 1 | 1-2 | 3-4 | 2 | |
| Effective measuring length | 2L | 2L(2 Rollers) 4L(4 Rollers) | 2L(2 Rollers) 4L(4 Rollers) | 1L | L is distance between rollers |
| Effective weight on load cell | $2P_L$ | Approx. $1.2P_L$ $2.2P_L$ | $4 \times 2/4P_L$ $4 \times 4/4P_L$ | $2 \times 1/2P_L$ | $P_L$ is the weight on the length of belt between rollers |
| Method to account for horizontal force | Single-Point load cell structure | Two levers cancelling each other | Apply force on horizontal tension spring | Structure of load cell and positions of installation | Vertical force is the unfavorable force generated in belt motion |
| Connection between load cell and weighing platform | Single point direct rigid connection | The weighing frame on two sides are double-hinged with the load cell | 4-point suspension | 2 flexible pivots | |
| Connection between weighing platform and conveyor belt frame | No connection | 4 hinged pivots | Horizontal tension springs | No connection | |
| Correlating or matching load cells | N/A | N/A | Yes | Yes | |
| Mass of weighing platform | 50 Kg | 400-800 Kg | 200-500 Kg | Approx. 30 Kg | Based on B = 800 belts |
| Deflection of weighing platform | Approx. 0.1 mm | 0.2-0.5 mm | 0.2-0.5 mm | Approx. 0.1 mm | Based on 100 Kg per meter of belt |

It can be seen that a bulk material high precision array belt weigher system of the preferred embodiment of the present invention has significant practicality and notable improvements over known weighing systems. Known belt weighers provide typical accuracy of 0.5%, which is unreliable. In contrast, the preferred embodiment of the present invention achieves substantially 0.1% accuracy. Therefore, it can be utilized in various situations and achieve accurate measurement of bulk material on long belt conveyors. It thus can become an accepted belt weighing system for legal and trade purposes, thus replace known methods for weighing bulk material which include waterline measurement.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A bulk material weighing unit for measuring the mass of a bulk material in motion on bulk material conveyor belt, the bulk material weighing unit comprising:
    a weight bearing element;
    a single-point load cell configured to measure only vertical force;
    means for fastening the single-point load cell onto the weight bearing element;
    a rigid weighing frame comprising a plurality of weighing roller assemblies having rollers for engaging with the conveyor belt and adapted to directly transfer the mass load of the bulk material to the single-point load cell, the rigid weighing frame being fastened onto the single-point load cell,
    wherein the single-point load cell is disposed at a central region of the rigid weighing frame and arranged such that the rigid weighing frame is wholly supported by the single-point load cell so that the force detected by the single-point load cell is substantially the same as the load of bulk material on the conveyor belt over the plurality of weighing roller assemblies.

2. A bulk material weighing unit in accordance with claim 1, wherein the rigid weighing frame includes roller brackets disposed below the single-point load cell.

3. A bulk material weighing unit in accordance with claim 1, wherein the rollers are disposed at substantially the same height as the single-point load cell.

4. A bulk material weighing unit in accordance with claim 2, wherein the rigid weighing frame includes a channel-shaped steel section which comprises side walls which are arranged to extend below the single-point load cell and connect to the roller brackets below the single-point load cell.

5. A bulk material weighing unit in accordance with claim 1, wherein the rigid weighing frame includes a channel-shaped steel beam having an open underside forming a cavity in which the single-point load cell is disposed.

6. A bulk material weighing unit in accordance with claim 2, wherein the roller brackets are constructed from steel channel.

7. A bulk material weighing unit in accordance with claim 4, wherein the weight bearing element is a base beam having two ends, and the two ends of the base beam extend beyond the channel-shaped steel section to connect to the rigid weighing frame and include a vertical baffle disposed near both ends of the base beam.

8. A bulk material weighing unit in accordance with claim 7, wherein triangular stiffeners are disposed between the vertical baffle and the extension of the base beam.

9. A bulk material weighing system adapted to be installed in a gap on a bulk material conveyor belt frame, the bulk material conveyor belt frame having fixed rollers installed at either end of the conveyor belt frame gap, the weighing system comprising a plurality of weighing units installed in the gap, each of the weighing units comprising:
    a weight bearing element fixed to the bulk material conveyor belt frame;
    a single-point load cell configured to measure only vertical force independent of bending momnents;
    means for fastening the single-point load cell onto the weight bearing element;
    a rigid weighing frame comprising a plurality of weighing roller assemblies for engaging with a conveyor belt and directly transferring the mass of a bulk material on the belt to the single-point load cell, the rigid weighing frame being fastened onto the single-point load cell, wherein
    the single-point load cell is disposed at a central region of the rigid weighing frame and wholly supports the rigid weighing frame so that the force detected by the single-point load cell is directly transferred so that it is substantially the same as the load of bulk material on the plurality of weighing roller assemblies, and
    the weighing system is configured, in use, to be installed between the fixed rollers at the ends of the conveyor belt frame gap.

10. A bulk material weighing system in accordance with claim 9, wherein the rigid weighing frame includes a channel-shaped steel section which comprises side walls which are arranged to extend below the single-point load cell and connect to roller brackets disposed below the single-point load cell.

11. A bulk material weighing system in accordance with claim 9, wherein the weighing frame includes at least two roller brackets disposed below the single-point load cell.

12. A bulk material weighing system in accordance with claim 9, wherein the weighing system includes between two and ten weighing units.

13. A bulk material weighing system in accordance with claim 12, wherein the weighing system includes eight weighing units.

14. A bulk material weighing unit for measuring the mass of a bulk material in motion on a conveyor belt, the weighing unit comprising:
    a weight bearing element;
    a single-point load cell configured to measure only vertical force independent of bending moments;
    means for fastening the single-point load cell onto the weight bearing element;
    a weighing frame which includes at least a pair of roller brackets on which are mounted weighing rollers for engaging with the conveyor belt for transfer of the bulk material in the direction of motion, the weighing frame positionally fixed onto the single-point load cell for transferring the whole load force of the bulk material to the single-point load cell, wherein
    the weighing rollers are spaced apart from one another at opposed upstream and downstream locations of the weighing frame, and the single-point load cell is disposed at a region intermediate the spaced apart weighing rollers and wholly supports the weighing frame so that the force detected by the single-point load cell is substantially the same as the load force of bulk material on the conveyor belt on the weighing rollers, and
    the weighing frame includes a channel-shaped steel section for fastening onto the single-point load cell, the channel-shaped steel section including two side walls extending below the single-point load cell so as to connect to roller brackets disposed below the single-point load cell.

15. A bulk material weighing unit for measuring the mass of a bulk material in motion on a conveyor belt, the bulk material weighing unit comprising:
- a weight bearing element;
- a single-point load cell configured to measure only vertical force;
- means for fastening the single-point load cell onto the weight bearing element;
- a rigid weighing frame comprising a plurality of weighing roller assemblies including rollers for engaging with the conveyor belt, the rigid weighing frame being fastened onto the single-point load cell, so that the rigid weighing frame is configured to transfer the whole of the mass load of the bulk material to the single-point load cell, wherein
- the single-point load cell is disposed at a central region of the rigid weighing frame and arranged such that the rigid weighing frame is wholly supported by the single-point load cell so that the force detected by the single-point load cell is substantially the same as the load of bulk material on the conveyor belt over the plurality of weighing roller assemblies, and
- the rigid weighing frame includes a channel-shaped steel section for fastening onto the single-point load cell, the channel-shaped steel section including two side walls extending below the single-point load cell so as to connect to roller brackets disposed below the single-point load cell.

16. A bulk material weighing unit in accordance with claim 15, wherein the rollers are disposed at substantially the same height as the single-point load cell.

17. A bulk material weighing unit in accordance with claim 1, wherein the single-point load cell is bolted onto the weight bearing element.

18. A bulk material weighing system in accordance with claim 9, wherein the single-point load cell is bolted onto the weight bearing element.

19. A bulk material weighing unit in accordance with claim 14, wherein the single-point load cell is bolted onto the weight bearing element.

20. A bulk material weighing unit for measuring the mass of a bulk material in motion on a bulk material conveyor belt, the bulk material weighing unit comprising:
- a weight bearing element;
- a single-point load cell configured to measure only vertical force, the single-point load cell being positionally fixed onto the weight bearing element;
- a rigid weighing frame comprising a plurality of weighing roller assemblies having rollers for engaging with the conveyor belt and adapted to directly transfer the mass load of the bulk material in motion on the conveyor belt to the single-point load cell, the rigid weighing frame being fastened onto the single-point load cell,
- wherein the single-point load cell is disposed at a central region of the rigid weighing frame and arranged such that the rigid weighing frame is wholly supported by the single-point load cell so that the force detected by the single-point load cell is substantially the same as the load of bulk material in motion on the conveyor belt over the plurality of weighing roller assemblies.

21. A bulk material weighing unit in accordance with claim 20, wherein the single-point load cell is bolted onto the weight bearing element.

* * * * *